United States Patent [19]

Willis et al.

[11] Patent Number: 4,680,632

[45] Date of Patent: Jul. 14, 1987

[54] TELEVISION DISPLAY SYSTEM WITH FLICKER REDUCTION PROCESSOR HAVING BURST LOCKED CLOCK AND SKEW CORRECTION

[75] Inventors: Donald H. Willis, Indianapolis; Russell T. Fling, Noblesville; Todd J. Christopher, Indianapolis, all of Ind.

[73] Assignee: RCA Corporation, Princeton, N.J.

[21] Appl. No.: 761,215

[22] Filed: Jul. 31, 1985

[51] Int. Cl.[4] .............................................. H04N 7/01
[52] U.S. Cl. ...................... 358/166; 358/11; 358/134; 358/140
[58] Field of Search ............... 358/166, 160, 140, 148, 358/134, 37, 11

[56] References Cited

U.S. PATENT DOCUMENTS

| | | | |
|---|---|---|---|
| 4,249,198 | 2/1981 | Ito et al. | 358/13 |
| 4,322,750 | 3/1982 | Lord et al. | 358/140 |
| 4,443,821 | 4/1984 | Kato | 358/326 |
| 4,573,080 | 2/1986 | Maze | 358/140 |
| 4,593,315 | 6/1986 | Willis | 358/140 |
| 4,595,953 | 6/1986 | Willis | 358/183 |
| 4,623,913 | 11/1986 | Fling | 358/11 |
| 4,630,098 | 12/1986 | Fling | 358/11 |
| 4,639,763 | 1/1987 | Willis | 358/11 |

OTHER PUBLICATIONS

Data Book "Digit 2000 NTSC Double Scan VLSI Digital TV System", published by ITT Intermetall. Edition 1985/5, pp. 41-72.

Primary Examiner—Tommy P. Chin
Attorney, Agent, or Firm—P. J. Rasmussen; P. M. Emanuel; R. G. Coalter

[57] ABSTRACT

A speed-up memory doubles the field rate of a video input signal by repeating each field to reduce flicker when the double field rate signal is displayed. Read/write clocks for controlling the memory are locked to the color subcarrier of the video input signal thereby tending to produce visual artifacts in the displayed image due to clock skew relative to sync when non-standard video signals are processed. The skew errors are corrected by circuitry which measures the skew of the read and write clocks and delays the video signal as a function of a difference between the clock skew measurements.

6 Claims, 7 Drawing Figures

TELEVISION DISPLAY SYSTEM WITH FLICKER REDUCTION PROCESSOR HAVING BURST LOCKED CLOCK AND SKEW CORRECTION

FIELD OF THE INVENTION

This invention relates to television display systems and particularly to systems employing one or more field memories arranged to increase the field rate of displayed images to reduce flicker.

BACKGROUND OF THE INVENTION

The threshold of perception of field flicker in a television display system is a function of the flicker frequency and the brightness of the display. Over the years displays have increased in brightness to the point where flicker is noticeable even in relatively high field rate systems (e.g., NTSC-60 Hz) and clearly objectionable in lower field rate systems (e.g., PAL-50 Hz). A solution to this problem is to double the field rate and double (or quadruple) the line rate of displayed images as described, for example, by Lord et al. in U.S. Pat. No. 4,322,750 entitled TELEVISION DISPLAY SYSTM which issued Mar. 30, 1982. In an example of the Lord et al. system, a video input signal is stored in a field memory. Each stored field is recovered or "read" twice from the memory and displayed on a display scanned at double the line rate and double the field rate of the incoming video signal.

In the Lord et al. system, the memory read and write clocks are derived from the output of a sync separator circuit. It would be advantageous, in certain applications, to lock the memory read and write clocks to multiples of the color subcarrier reference frequency to thereby simplify chroma demodulation and to minimize the possibility of cross-color effects and other undesirable artifacts in displayed images.

SUMMARY OF THE INVENTION

As recognized herein, however, the use of "burst-locked" clocking in a flicker reduction system can cause undesirable visual artifacts in displayed images when the video input signal is of "non-standard" form. As used herein, the term non-standard refers to video signals wherein the ratio of the color subcarrier frequency to horizontal line frequency does not conform exactly to a specified broadcasting standard (e.g., 227.5 in the NTSC standard). Where, for example, the video source is a video disc player, a video cassette recorder, a video "game" unit or some other non-standard source, the burst/line-frequency ratio may vary significantly. As a result, the number of video samples (pixels) in a horizontal line period will not, in general, be 910 (assuming a 4 fsc write clock). The number of 4 fsc clock periods contained within one horizontal line period, in other words, will differ from the standard and this difference may include a fractional part of one pixel.

The deviation of the number of samples (pixels) per line from the standard (910) is difficult to deal with because it represents a precession of the sampling signal clock phase with respect to the incoming horizontal synchonizing signal phase. The effect of this precession or "phase-slip" or "skew" is that horizontal timing errors accumulate throughout each field scan. Moreover, in a flicker reduction system where a coherent 8 Fsc read clock is used with double (2 H) standard rate deflection for the display, the 8 Fsc read clock precession relative to the 2 H deflection will be double that of the 4 Fsc (write) clock precession relative to the 1 H incoming video signal. This problem can cause accumulated horizontal timing errors, for the assumed conditions, of 12% (or more) of a line over a field interval or full-pixel timing discontinuities between occasional lines. The visible effects may be seen as picture skew, ragged edges or other undesirable artifacts.

In view of the foregoing, one might consider pre-processing the video signal prior to "speed-up" in the flicker reduction processor (FRP) with a conventional time-base corrector (TBC). Examples of time-base correctors suitable for use with video tape recorder (VTR) reproduced signals are given in U.S. Pat. Nos. 4,249,198 of Ito et al., and 4,443,821 of Kato, herein incorporated by reference. In Ito et al. a digitized video signal provided by an un-synchronized VTR is stored in the TBC memory (one field) and the storage location as well as delay prior to storage of the video signal is controlled in response to the phase difference between the incoming video synchronizing signal components and a constant reference signal (e.g., "house synch"). The TBC of Kato is specifically addressed to correcting intra-line velocity errors of a VTR reproduced signal and includes a velocity error detector for detecting velocity errors in successive lines of the video signal written into memory. A sample level compensator at the output of the TBC memory adjusts the level of the video samples (pixels) read out from the memory as a function of the detected velocity error such that the level of the read out sample is modified to be equal to the level that the read-out sample should have had at the time it was read if there had been no velocity error.

It is recognized herein that the use of conventional time-base correction techniques will not solve the timing problems encountered in flicker reduction video display systems. The problem in flicker reduction systems involves more than time-phase errors (e.g., "jitter"), it involves non-standard signals wherein there may be a variation of the number of pixels per line and this variation is effectively multiplied by the double reading of the speed-up memory. The aforementioned problem does not exist in conventional time-base correctors because there each line is read only once and at the same rate as it was written. Simply stated, in a flicker reduction display system, the field memory is read twice and the correction for the second read operation can differ line by line than that needed for the first read cycle and each read operation may require video delay compensation which is a fractional part of a pixel interval. Moreover, if left un-corrected, read errors caused by variations of the number of pixels per line due to a non-standard signal tend to accumulate as previously mentioned.

The principles of the invention may be advantageously applied to flicker reduction systems of the type in which a clock source is coupled to supply read and write clock signals to a memory means for causing the memory means to store at least one field of a video input signal having given line and field rates and to recover the stored signal to provide a video output signal having a field rate N-times the given field rate and a line rate at least N-times the given line rate for display on a display means.

In accordance with a first aspect of the invention, means are provided for applying the video input signal to the clock source for synchronizing the clock signals at integer multiples of the frequency of a color subcarrier components of the video input signal. A skew generator means, responsive to at least the write clock signal and to a horizontal synchornizing component of the video input signal, provides a write clock skew indicating signal and read clock skew indicating signal. A delay means, coupled to the memory means, imparts an effective delay to the video output signal as a function of a difference between the skew indicating signals.

In an exemplary embodiment of the invention, the video input signal is delayed as an inverse function of the write clock skew indicating signal and the video output signal is delayed as a direct function of the read clock skew indicating signal In a further embodiment of the invention, means are provided for storing the write clock skew indicating signal with the video input signal in the memory. The stored write clock skew indicating signal is recovered from the memory and combined with the read clock skew indicating signal to form a difference signal for controlling the delay of the video output signal.

BRIEF DESCRIPTION OF THE DRAWING

The invention is illustrated in the accompanying drawing, wherein like elements are identified by like designators, and in which.

DETAILED DESCRIPTION

Figure 1:
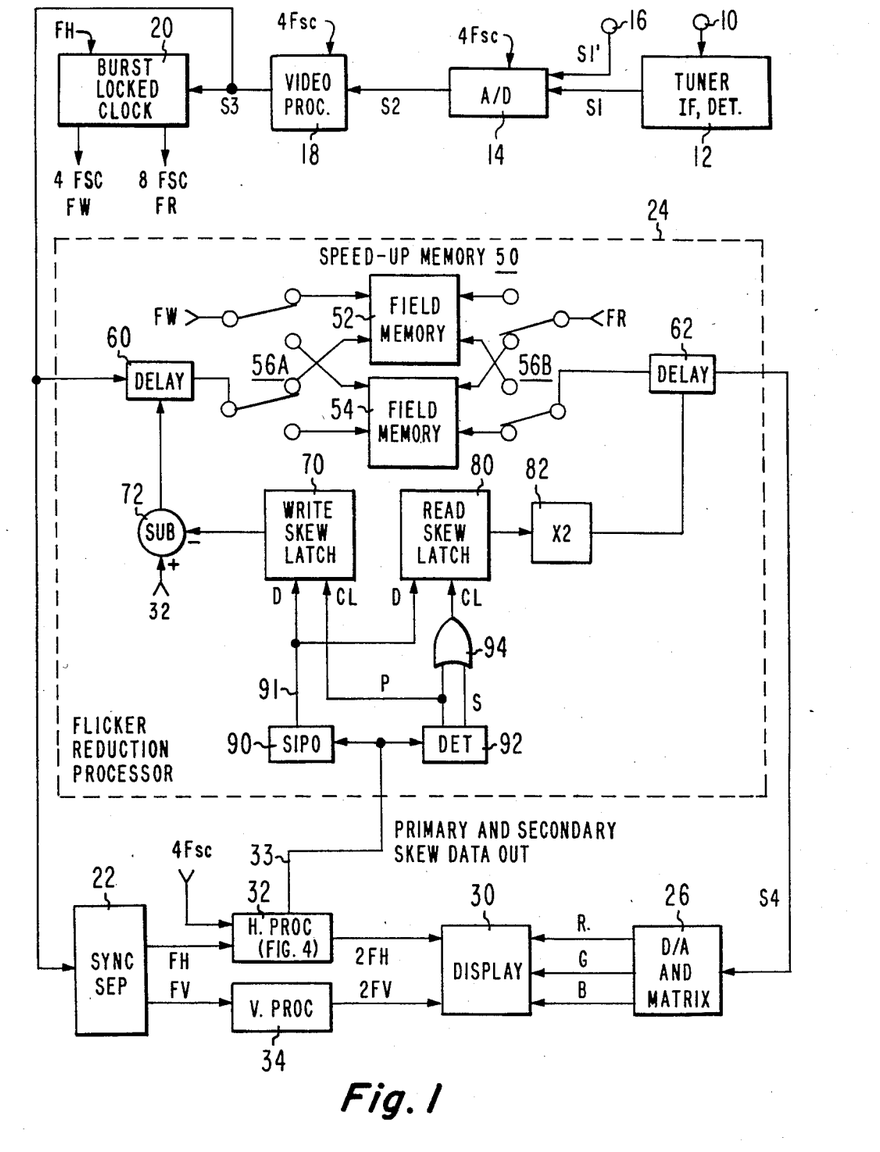
FIGS. 1 and 2 are block diagrams of television receivers embodying the invention.

The receiver of FIG. 1 includes an antenna (ANT.) input terminal 10 coupled via a tuner, IF amplifier and video detection unit 12 of conventional design to the input of an analog-to-digital converter 14. Unit 12 processes RF modulated video signals applied to terminal 10 to provide a baseband analog video signal S1 which is converted to digital form (signal S2) in (A/D) converter 14. The RF signal (as herein before defined) may be provided by an antenna, a tape recorder, video game, computer or other source. An auxilliary (AUX.) input terminal 16 is provided for obtaining the analog baseband video signal S1' from a source having provisions for baseband video output.

The digitized video signal S2 is applied to a video processing unit 18 of conventional design which provides various processing functions such as color separation, luminance peaking, contrast control, hue and saturation control, etc. The processed video signal S3 is applied to a burst locked clock 20, to a sync separator 22 and to a flicker reduction processor (FRP) 24 (outlined in phantom). Clock 20 comprises a phase lock loop (PLL) keyed by horizontal sync pulses FH provided by sync separator 22 to provide read (FR) and write (FW) clock signals having frequencies locked to eight-times and four-times the frequency of the color subcarrier component (burst) of video signal S3. For NTSC and PAL standard video input signals the 4 Fsc write clock frequencies are about 14.318 MHz and 17.734 MHz, respectively. The read clock frequency (8 Fsc) is double the write clock frequency in this example of the invention in which the display line and field rates are double the incoming video line and field rates.

The field rate of the video signal S3 is doubled in flicker reduction processor 24 by means of a speed-up memory 50 as will be described. Briefly, memory 50 stores each incoming field and, as one field is being stored, the previously stored field is recovered or "read" two times thereby doubling the field rate of the video output signal (S4). Since two output fields are produced during the time interval of each incoming field, the line rate of the video output signal is doubled. If it is desired to also double the number of lines in each field (e.g., by interpolation), then the line rate of the video output signal would be quadrupled.

The video output signal S4 is applied to a conventional digital-to-analog (D/A) convertre and matrix unit 26 which converts signal S4 to analog R, G, B form for application to a display unit 30. Horizontal and vertical processing units 32 and 34, respectively, double the frequency of the normal line rate (FH) and field rate (FV) sync signals produced by sync separator 22 and supply the double signals 2FH and 2FV to display 30 for synchronizing the display sweep with the double field rate video output signal S4. Since the field rate has been doubled by repeating fields in flicker reduction processor 24, the number of lines per field of the displayed images is unchanged. Therefore the vertical and horizontal resolution of displayed images is not altered but the flicker frequency is doubled since the fields are displayed twice as often. For PAL and NTSC standard signals the flicker frequency is increased to 100 Hz and about 120 Hz, respectively. These frequencies are substantially in excess of the persistence of the human visual system and thus the displayed image will appear to be flicker free for all practical purposes.

In the previously described flicker reduction system of Lord et al. the speed-up memory receives clock signals derived from the synchronizing component of the video input signal. Accordingly, each picture element (pixel, hereinafter) stored in the memory has a fixed horizontal relationship to sync and so the system they describe is not subject to phase erros (skew) of the clock relative to sync. The system clock 20 of FIG. 1, however, is locked to burst and therefore the system is sensitive to clock skew errors because the input signal will be stored in the speed-up memory with one phase relative to the incoming sync and will be recovered from the memory and displayed with a different phase relative to the display sync. If uncorrected, the skew errors will result in undesirable visual artifacts being displayed such as ragged vertical edges, pixel missalignment and whole pixel discontinuities during occasional lines.

In this example of the invention, skew errors of the write clock are corrected prior to storage of the video input signal S3 in speed-up memory 50 and skew errors of the read clock signal FR are corrected upon readout of each line stored.

Speed-up memory 50 of flicker reduction processor 24 comprises a pair of one field memories 52 and 54 and a four-pole two-position switch having input and output sections 56A and 56B, respectively. For the switch position shown, input section 56A applies the write clock signal FW to memory 52 and couples the video input signal to memory 52 via a delay unit 60 thereby storing the video input signal S3 in memory 52 and imparting a write skew correction to signal S3 in proportion to the delay provided by unit 60. Concurrently, switch section 56B applies the read clock (FR) to field memory 54 and couples the output of memory 54 to D/A and matirx unit 36 via a further delay unit 62 thereby imparting a read skew correction to signal S4 in proportion to the delay of unit 62. This process continues line by line until one entire field of signal S3 has been stored in memory 52 and the field previously stored in memory 54 has been read out two times. The position of switch sections 56A and 56B is then reversed and the process is repeated with the video input signal being stored in memory 54 and the previously stored field being recovered from memory 52.

The delay imparted to the video input signal S3 by delay unit 60 is inversely related to the value of the write clock skew which is measured in horizontal processing unit 32 and stored in a latch 70 as will be described. An inverse relationship is obtained by means of a subtractor 72 which subtracts the skew data word stored in latch 70 from a constant (32 in this instance) and the resultant difference signal is supplied to control the delay of unit 60. The number "32" corresponds to the period of one cycle of the write clock as will be explained. Thus, as the write clock skew increases, the output of subtractor 72 decreases thereby advancing the signal S3 in time in proportion to the skew.

As an exmaple, if the write clock skew at the start of a line is one-fourth pixel, then the delay of unit 60 will be reduced by one-quarter pixel from its initial delay (e.g., one pixel) whereby the line of signal S3 stored in speed-up memory 50 will be "de-skewed", that is, it will be stored with a skew of essentially zero with respect to horizontal sync. All lines stored will therefore have essentially no skew with respect to the video input signal.

Figure 3:
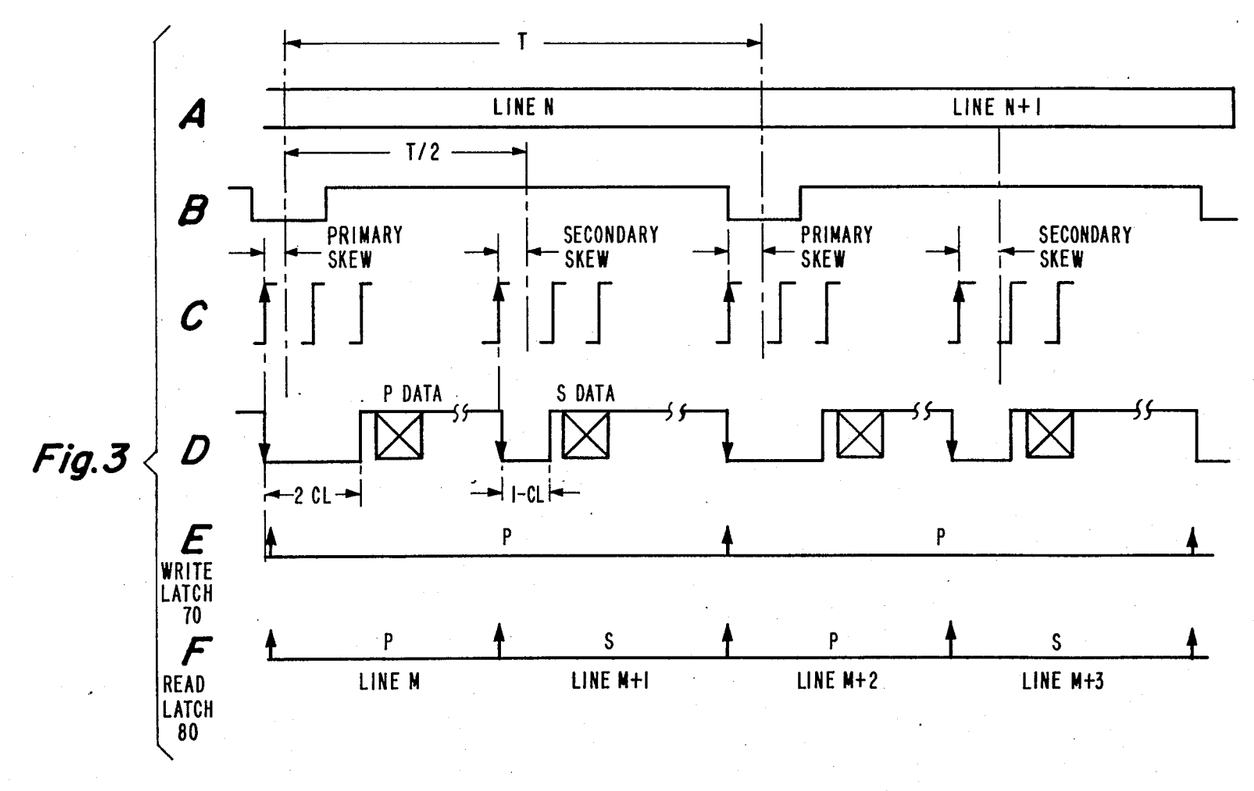
FIG. 3 is a timing diagram associated with the receivers of FIGS. 1 and 2.

The write skew information comprises a five-bit word which represents the time interval between the leading edge of the last write clock pulse preceeding the center of the horizontal synchronizing component of the video input signal S3 (FIG. 3, Waveforms B and C). This time difference is expressed herein in terms of fractions of one cycle of the write clock period. The 5 bit representation of the skew thus represents the skew error int erms of thrity-secondths of one write clock period. This is illustrated in FIG. 3 wherein waveform A represents the horizontal line interval of signal S3, waveform B represents the horizontal synchronizing component of signal S3 and waveform C represents the 4 Fsc write clock signal FW (not to scale). The time interval between the positive transition (up arrow) of the write clock (C) and the center of horizontal sync of signal S3 (B) is labled "Primary Skew" in the drawing because it is used for two purposes in the flicker reduction processor. Firstly, the primary skew is the directly measured skew of the write clock and it is used for all write clock skew corrections. As each line of the video input signal 3 is stored in speed-up memory 50 it is advanced in time by the value of the "primary" skew value stored in latch 70 and thus each stored line has a fixed time relationship to horizontal sync of signal S3.

The second function of the "primary" skew data is to provide a basis for read clock skew correction by delay unit 62. Recall that delay unit 60 only "de-skews" the video input signal S3 with respect to the write clock skew. The read clock signal FR is, however, also skewed with respect to the double line-rate horizontal deflection of display 30 when non-standard signals are received. Each line read from the speed-up memory 50 is delayed by delay unit 62 by an amount equal to the skew of the read clock with respect to the double line rate deflection of display 30. The read clock skew therefore must be determined by some means. This might be done, for example, by directly measuring the skew of the read clock with respect to the double line-rate horizontal synchronizing signal 2-FH supplied to display 30. In the example of the invention of FIG. 1, however, the read clock skew is not directly measured but, rather, is derived from the write clock skew as will be explained.

In more detail, the "primary" skew signal produced in processor 32 represents the skew of the write clock as previously indicated. The read clock is operated at twice the frequency of the write clock. Accordingly, the read clock skew with respect to the double line-rate deflection has a predictable relationship with the write clock skew. Specifically, the read skew of each line recovered from speed-up memory 50 at the start of a write cycle equals twice the value of the write or "primary" skew. This follows because the read clock period is exactly one-half of the write clock period. Thus, a write skew error of a given value need only be doubled to represent a read skew error of each line read during the first half of a write operation (e.g., lines M, and M+2 of FIG. 3).

Memory 50, it will be recalled, is read twice as quickly as it is written. If one were to use the measured write skew or "primary" skew for correcting all read skew errors, then every other line (M+1, M+3 FIG. 4) would be displaced by one line's worth of accumulated skew thus producing a serrated edge effect in displayed images. This problem is solved by estimating the write clock skew with respect to the double line rate deflection and doubling the estimated value to arrive at the read clock skew for displayed lines which begin in the middle of each write operation (e.g., M+1, M+3, etc.).

The estimate of read clock skew is performed by arithmetic circuits in processor 32 and is referred to herein as "secondary" skew. The calculation is made in unit 32 by measuring the period of the incoming horizontal sync pulses, dividing the period by two to give the period of the 2-FH deflection pulses and adding the result to the write clock skew. The fractional part of the sum represents the skew of the read clock with respect to the 2-FH deflection for all lines read from memory 50 during the second half of one write operation (M+1, M+3, etc). This "secondary" skew data is stored alternately with the primary skew data in a latch 80 for controlling the delay of unit 62 directly in proportion to the read skew. The primary skew is stored in latch 80 during lines M, M+2, etc. The secondary skew is stored during lines M+1, M+3, etc.

Since the primary and secondary skew values are both derived form measurements of the write clock and not the read clock, these values of skew must be doubled when determining the delay imparted to the video output signal S4 by delay unit 62. This function is provided by a multiplier 82 which couples the output of the read skew latch to delay unit 62.

The primary and secondary skew data provided by processor 32 could be coupled directly to processor 24 for storage in latches 70 and 80. If done in parallel form a large number of conductors would be required. Horizontal processing unit 32 avoids this problem by sending the primary and secondary skew data in time division multiplexed form to flicker reduction processor 24 via a single conductor 33. The data format is illustrated in FIG. 3 by waveform D (not to scale). The primary skew data for lines M, M+2, etc. is identified by a low level of the signal waveform for two clock cycles. This indentifying "preamble" is followed by a five bit word representing the primary skew data. The secondary skew data is sent at the beginning of lines M+1, M+3, etc. but is preceeded by a one clock cycle preamble to identify it as secondary (calculated) skew information. Timing for the skew data is provided by the negative transition of the "preamble" pulse which occurs at the leading edge of the last write clock pulse prior to the center of the horizontal synchronizing component of the video input signal S3.

The skew data is demultiplexed and stored in latches 70 and 80 in processor 24 by means of a serial-in parallel-out (SIPO) register 90, a pulse width detector 92 and a two input OR gate 94. Register 90 converts the serial skew data to parallel form and supplies the parallel data to the inputs of the read and write latches vi bus 91. Pulse width detector 92 identifies the preamble of the data as being P (primary) or S (secondary). The "P" output of detector 92 is applied directly to the clock input of the write latch. The P and S outputs are applied to the clock input of the read latch 80 via OR gate 94. Accordingly, as illustrated by waveform E in FIG. 3, the primary skew data is stored in the write latch 70 at the start of each line being written in speed-up memory 50. As shown by waveform F, the primary and secondary skew data are alternately stored in the read latch 80. The primary skew data is used for correcting the skew of the output signal for all lines which are read during the first half of each write operation (M, M+2, etc.) and secondary skew data is used for all lines read during the second half of each write operation (M+1, M+3, etc.). The timing edge which accompanies the multiplexed skew data may be used for resetting the read address counter (not shown) for memory 50 to initiate the read operations for each line.

Figure 6:
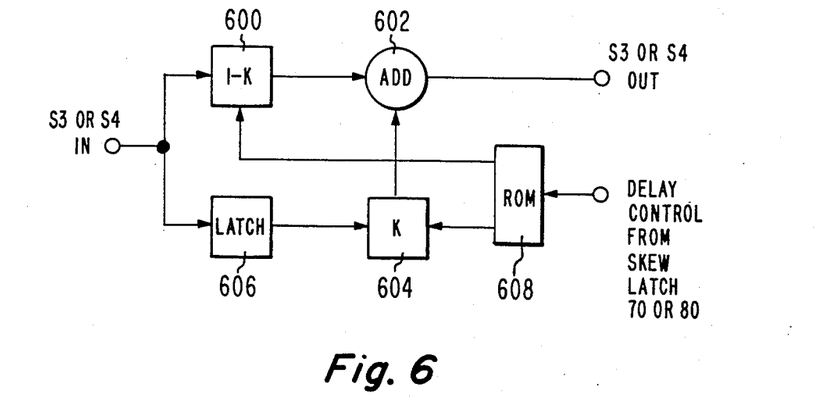
FIG. 6 is a block diagram of a delay device suitable for use in the receiver of FIGS. 1 and 2.

When implementary the system of FIG. 1 it is necessary to impart fractional clock period delays to both the video input signal S3 and to the video output signal S4 as previously explained. For this purpose the delay units 60 and 62 may be implemented, illustratively, by means of a two-point linear interpolator as shown in FIG. 6. The video signal to be delayed (S3 or S4) is applied via a multiplier 600 to one input of an adder 602 and via a cascade connection of another multiplier 604 and a delay switch 606 to the other input of adder 602. Latch 606 provides a one clock period delay (e.g., 70 nanoseconds for signal S3 or 35 nanoseconds for signal S4). The multiplier coefficients (K and 1−K) are provided by a read only memory (ROM) 608 which varies the gain of multiplier 604 in direct proportion (K) to the skew data (from latch 70 or 80) and varies the gain of multiplier 600 inversely (1−K) as the skew data whereby the ratio of delayed and non-delayed signals which are added in adder 602 are controlled by the values of the skew data. For example, when the skew data is zero the value of K is zero and the input signal passes without delay through multiplier 600 and adder 602 to the output. As K increases more of the delayed signal and less of the undelayed signal are added thereby increasing the delay of the output signal. In the limit (K=1) all of the input signal passes through the delay latch 606 to the output thereby delaying the signal by one full period of the clock.

When delaying a video signal by means of an interpolator as described, the signal is necessarily subjected to interpolation error. In the system of FIG. 1 the video signal is delayed prior to storage in speed-up memory 50 to correct write clock skew errors and is delayed again when it is recovered from the memroy to correct read clock skew erros. If the delay is provided by interpolators, the interpolation erros are cumulative. This problem is avoided in the system of FIG. 2 by providing all delay for clock skew correction subsequent to speed-up of the video signal in memory 50.

Figure 2:
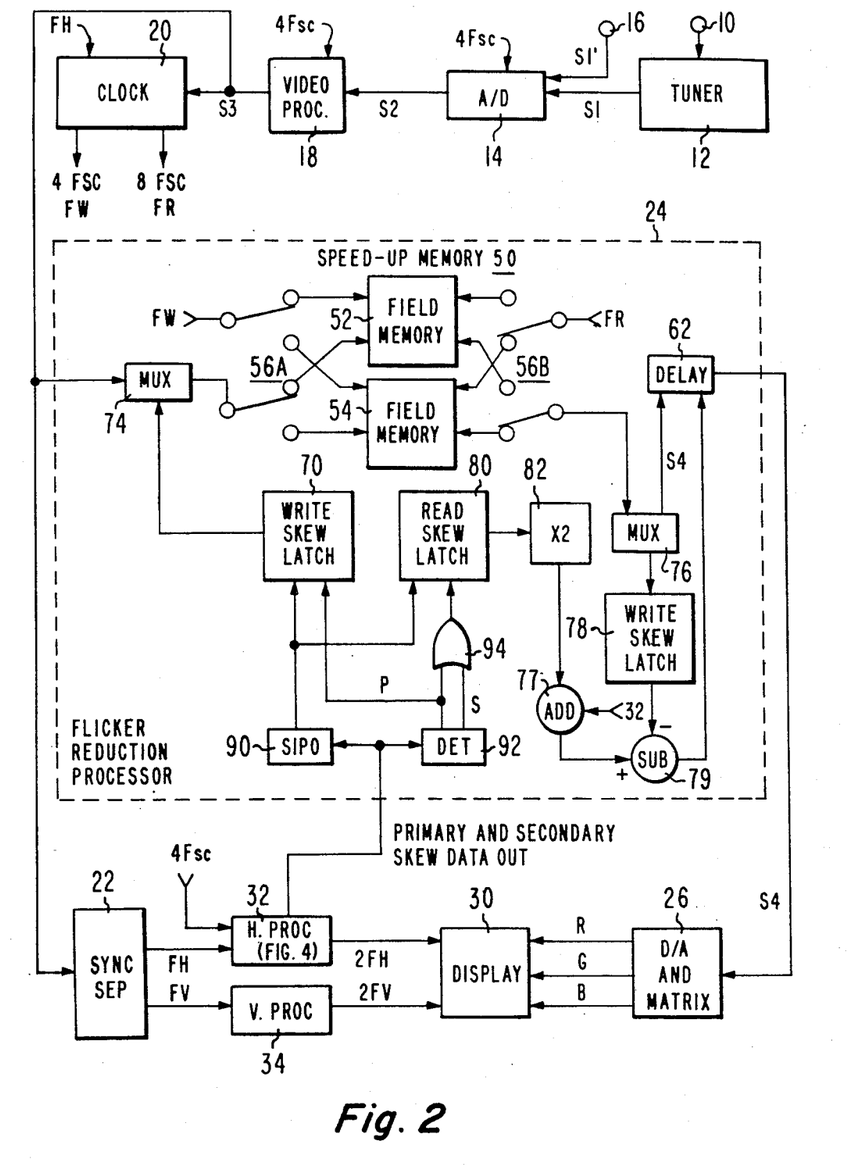

As an overview, in FIG. 2 the write clock skew signal is stored in the speed-up memory along with the video signal S3 and the arithmetic operations of adding a constant and subtracting the write clock skew are done subsequent to speed-up when the skew data is recovered from the memory. This enables the read and write clock skew data to be combined for controlling delay unit 62 and thus eliminates the need for interpolation prior to video speed-up and therefore provides a desirable reduction in interpolation errors.

In detail, latches 70 and 80 store the read and write clock skew data as previously described. The write clock skew data is combined with the video input signal S3 for storage in speed-up memory 50 by means of a multiplex switch 74 which is operated at line rate (FH) to insert the write skew data in the horizontal blanking interval of the video signal S3. This method of storing the skew data in speed-up memory 50 has the advantage of requiring no additional memory locations since the skew data replaces video data during the blanking interval. Alternatively, the write skew data may be stored directly in memory 50 in locations specifically assigned for it thereby eliminating the need for a multiplex switch but requiring a small increase in memory space (e.g., 5 bits per line).

The write skew data is recovered from memory 50 and separated from the video output signal S4 by means of a further multiplex switch 76 and stored in a further write skew latch 78. Switch 76 also may be deleted if the write skew data is stored directly in memory 50 rather than being inserted in the horizontal blanking interval of the video signal as previously explained. The read skew data stored in latch 80 is doubled in multiplier 82 and added to the constant "32" in an adder 77. As previously explained, the read skew is doubled because it is calculated in unit 32 on the basis of the write clock which has twice the period of the read clock. The constant "32" represents the time interval of one clock period and is added to ensure that the delay correction value is always a positive number. The write skew data stored in latch 78 is subtracted from the output of adder 77 by means of a subtractor 79 and the resultant difference signal is applied to delay unit 62 for correcting read and write clock skew errors concurrently. The delay correction, expressed mathmetically, thus equals X+2SR−SW wherein SR is the skew of the read clock, SW is the skew of the writ eclock and X is the constant used to avoid "negative" delays. This correction is mathmetically the same as in the example of FIG. 1 but the interpolation error in the example of FIG. 2 has been reduced by a factor of two due to the elimination of delay unit 60.

Figure 4:
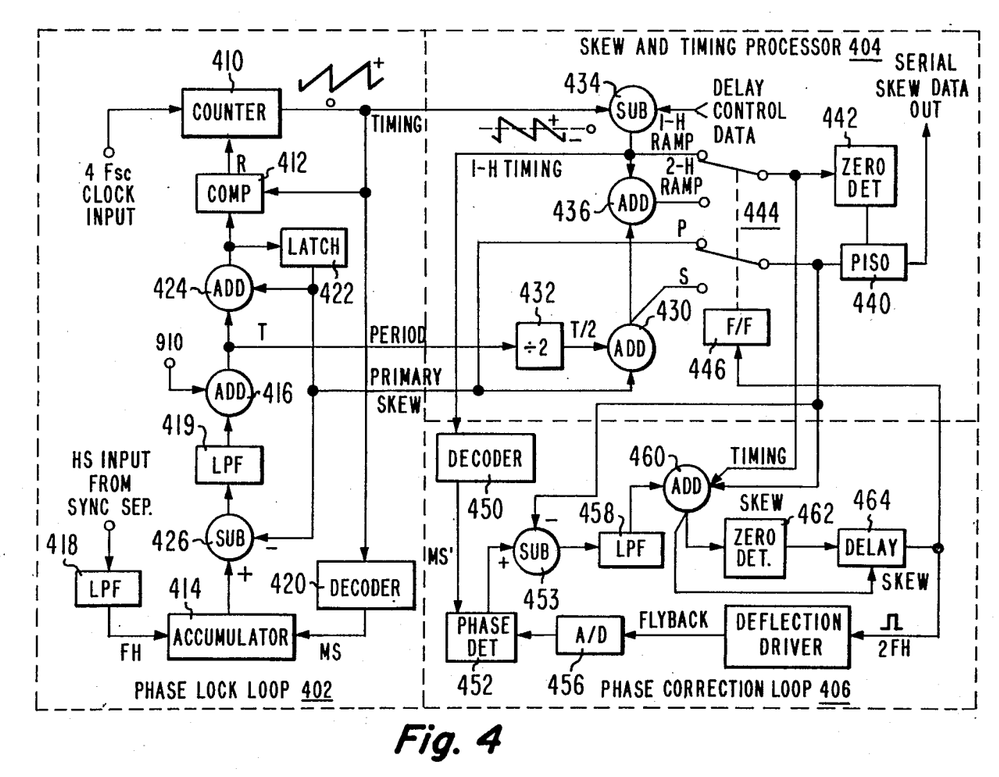
FIG. 4 is a detailed block diagram of skew measurement apparatus suitable for use in the receivers of FIGS. 1 and 2.

FIG. 4 is a detailed block diagram of horizontal processing unit 32. The principal elements, outlined in phantom, comprise: (1) a phase lock loop 402 which measures the primary skew and measures the perod of the horizontal synchronizing component of the video input signal; (2) a skew and timing processor 404 which calculates the secondary skew from the primary skew and the period of the video input signal and multiplexes the skew (and timing) data to flicker reduction processor 24; and (3) a phase correction loop 406 which generates double line rate deflection pulses (2 FH) for display unit 30. An integrated circuit which includes these elements is type DPU 2532 Deflection Processor Unit which is described at pages 47-72 of the databook "Digit 2000 NTSC Double-Scan VLSI Digital TV System" of ITT Intermetall, edition 1985/5.

Phase lock loop 402 (outlined in phantom) includes a counter 410 which is clocked by the 4 Fsc write clock signal FW and reset by a comparator 412 when the count equals the period, T, of the horizontal cynshornizing component, FH, of the video input signal S3. The period of signal S3 is determined by means of an accumulator 414 and an adder 416 as follows. The sync signal FH from separator 22 is low pass filtered by filter 418 and applied to accumulator 414 which measures the time difference between the center of pulse FH and the occurrence of a master sync pulse MS provided by a decoder 420 coupled to the output of counter 410. This time difference (or error) signal is scaled so as to represent the error in terms of cycles (and fractional cycles) of the write clock. It is then low pass filtered (in filter 419) and added inadder 416 to the number 910 which equals the number of 4 Fsc write clock periods in one line of an NTSC standard signal. The period indicating signal, T, thus provided by adder 416 controls the threshold of comparator 412 thereby locking counter 410 to the horizontal synchronizing component of the video input signal.

When non-standard signals are received the period of counter 410 will be in error by an amount equal to the skew of the write clock signal. This results because counter 410 only counts integer cycles of the write clock signal whereas the period of the sync pulses FH may include a fraction of one clock cycle. Since the master sync pulse MS is generated by decoding the count of counter 410 it, too, will occur only at integer cycles of the write clock and so will also be in error by the amount of the write clock skew. The output of accumulator 414 will also include the skew error because it is synchronized by pulse MS. The remaining elements of PLL 402 provide the function of detecting the skew of the write clock and correcting the skew error of the period signal, T.

Skew errors are detected by means of a latch 422 and an adder 424. Skew, it will be recalled, is the time difference between clock and sync expressed in fractions of a clock cycle as shown in FIG. 3. If it is assumed that the value of the period indicating signal, T, correctly represents the line period of the video input signal, and if the fractional part of signal T is not zero, then line-to-line changes in the skew will be occur. As an example, if the period of signal FH is exactly 910.1 clock cycles long, then the write clock FW will precess with respect to sync (FH) at the rate of exactly 0.1 clock cycles per line. Thus, if the skew is zero at the start of line 1, it will be 0.1 at the start of line 2, 0.2 at the start of line 3 and so on. Skew data is generated by means of adder 424 which adds the skew of the previous line (stored in latch 422) to the period signal T. The fractional part of the sum is then stored in latch 422 which thus functions as an accumulator for the skew data. The integer part of the sum is applied to comparator 412 for adjuting the period of counter 410.

Skew detection was based on the assumption that the period indicating signal T correctly represented the period of the video input signal. From the previous discussion, however, the accumulator 414 output contains the skew error because it is timed by pulse MS which can only occur at integer clock cycles. This error is removed from signal T by means of subtractor 426 which subtracts the detached skew data provided by latch 422 from the output of accumulator 414.

Figure 5:
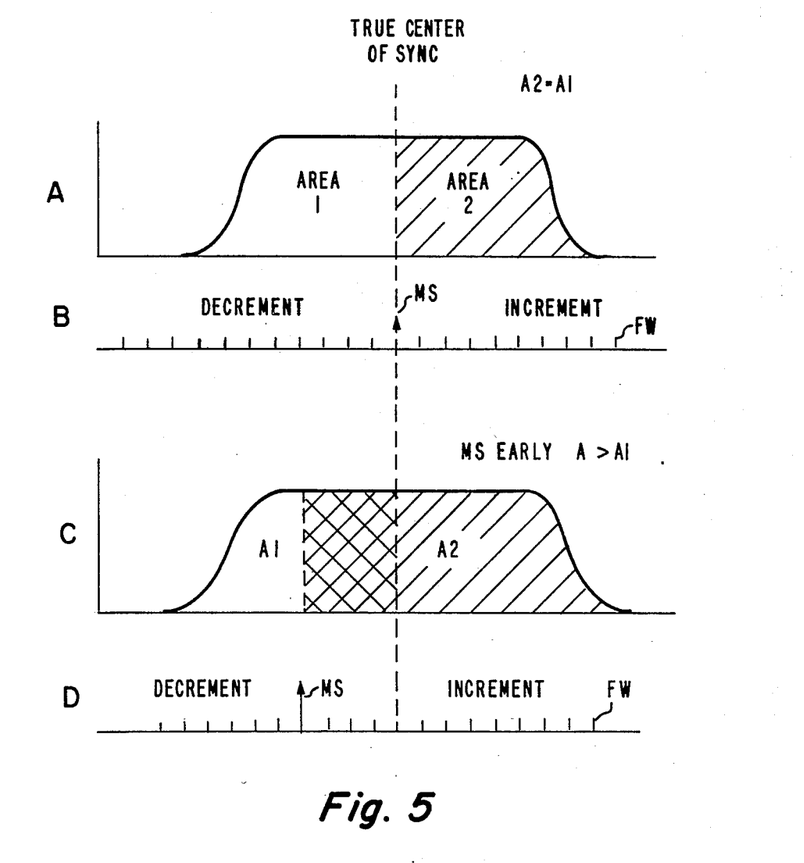
FIG. 5 is a timing diagram associated with the apparatus of FIG. 4.

Accumulator 414 provides phase measurements to an accuracy finer than the resolution of the system clock (FW). It may be constructed as described, for example, in U.S. Pat. No. 4,471,299 which issued Sept. 11, 1984. FIG. 5 herein provides a simplified illustration of how the measurements may be made. Waveform A shows pulse FH as a function of time. Accumulator 414 essentially measures the areas of pulse FH which preceed (Area 1) and follow (Area 2) pulse MS (Waveform B). This may be done by setting the accumulator count initially to zero, decrementing the count in proportion to the magnitude of pulse FH at each clock cycle (vertical tic marks) which preceed pulse MS and incrementing the count in proportion to the amplitude of pulse FH at each clock cycle after pulse MS. If pulse MS is exactly aligned with the center of pulse FH (as shown) then areas 1 and 2 will be equal and the accumulator ouptut will be zero. If pulse MS preceeds the center of pulse FH, then the areas will differ (as shown in by C and D) and the accumulator output will be proportional to the cross-hatched area. This area represents the time difference between pulse MS and the true center of the horizontal sync pulse FH. One may then scale the accumulator output to express the result in terms of write clock cycles (and fractions thereof).

Skew and timing processor 404 includes arithmetic circuitry for deriving the secondary skew data from the primary skew data and multiplex circuitry for transmitting the skew data to flicker reduction processor in the format shown by waveform D of FIG. 3. The secondary skew data S is produced by an adder 430 which adds the primary or write clock skew data P provided by latch 422 to the ouptut of a divider 432 which divides the period signal T by 2. The fractional part of the sum of the half period (T/2) signal and the write clock or primary skew P is the skew of the read clock (secondary skew, S) for lines M+1, M+3 etc. (FIG. 3).

The integer part of the sum signal provided by adder 430 is used to generate double line-rate (i.e., 2−H) timing pulses as follows. The ramp signal produced by counter 410 ranges from zero to some maximum value (e.g., 910 for NTSC standard signals or within a few counts of 910 for non-standard signals). A subtractor 434 subtracts the counter signal from a constant (labeled "delay control data") thereby producing an inverted ramp (as shown) which begins at a positive value determined by the value of the delay control signal and proceeds through zero to a negative peak. Zero crossings are easily detected in digital systems and by varying the delay control signal, the zero crossing time of the ramp may be advanced or retarded. Line rate timing pulses (1−H) are produced by detecting zero of the ramp signal provided by subtractor 434. Double line rate (2H) timing pulses are produced by offsetting the ramp by one-half period (T/2) and detecting zero. (The offset is provided by adder 436, detection is provided by zero detector 442). By this means it is ensured that any change in the position of the line-rate (1−H) pulses will be tracked exactly by the double line-rate (2−H) pulses when the delay control signal is varied for such purposes, illustratively, as correcting the display sweep for processing delays the speeded-up video signal S4 may be subjected to.

The skew data is converted to serial form (FIG. 3 waveform D) by means of a parallel-in serial-out (PISO) register 440 which is timed by pulses produced by a zero detector 442. A line rate operated switch 444 alternately applies the 1−H and 2−H ramp signals (from subtractor 434 and adder 436 respectively) to detector 442 and alternately supplies the primary (P) and secondary (S) skew data (from latch 422 and adder 430, respectively) to PISO 440. Detector 442 triggers PISO 440 to transmit the P or S skew data to flicker reduction processor 24 when the 1−H or 2−H ramp signal it receives equals zero. Switch 444 is controlled by a flip flop 446 which divides the frequency of the double line rate (2−H) deflection pulses produced in phase correction loop 406 by two. Thus, as shown in FIG. 3 by waveforms D, E and F, the primary and secondary skew signals are multiplexed to flicker reduction processor 24 and processed as previously described.

Phase correction loop 406 receives the ramp signal of subtractor 434 and the timing and skew signals from switch 444 and generates double line-rate deflection signals (2−FH) for display 30. The ramp output of subtractor 434 is detected by a decoder 450 to provide a delayed, line-rate (1−H) master sync pulse (MS'). The double line-rate sync pulses 2FH are produced by means of a phase detector 452 which compares the phase of flyback pulses FB produced by a deflection driver 454 (and digitized by a converter 456) with pulse MS'. Since the master sync pulse MS' occurrs on a clock edge, it contains skew errors which will appear in the output of phase detector 452. These are removed by subtractor 453 which subtracts the skew data of processor 404 from the output of detector 452. The error signal (at the output of subtractor 453) produced by detector 452 is low pass filtered in filter 458 and added in adder 460 to the timing and skew signals provided by switch 444. The integer part of the resultant sum signal is zero detected by detector 462 thereby producing double line-rate pulses 2−FH which are applied to the deflection driver via a delay unit 464 controlled by the fractional part of the sum signal provided by adder 460 to thereby correct for clock skew errors in the deflection pulses (2−FH). In effect, the same primary and secondary skew signals used for correcting memory read/write operations are applied to the deflection driver to ensure that the display sweep is corrected in the same manner as the memory skew errors. Accordingly, skew erros which are corrected in the flicker reduction processor 24 are not re-introduced by deflection skew errors.

Figure 7:
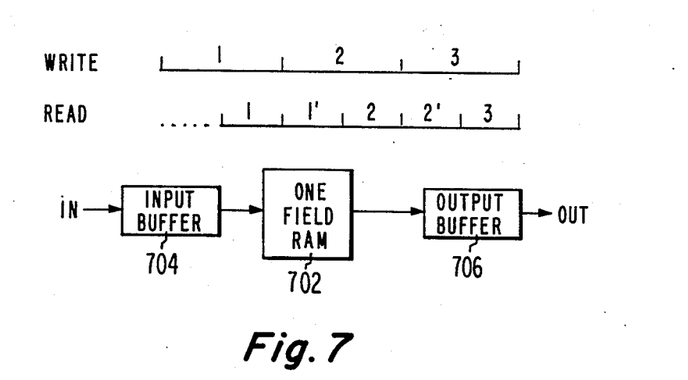
FIG. 7 is a block diagram of an alternative speed-up memory architecture suitable for use in the receivers of FIGS. 1 and 2.

The speed up memory 50 of FIGS. 1 and 2 may be modified as shown in FIG. 7 to reduce the memory storage requirements. Specifically, the two one-field memories 52 and 54 may be replace by a one field memory (RAM) 702 provided with input and output buffers 704 and 706 respectively. In operation, buffer 704 time compresses each line of the video input signal to be stored in the field RAM so that data can be read from the RAM between each write cycle. Stored lines are extracted from RAM 702 in groups of two or more lines at a time and stored in the output buffer 706 for subsequent readout in serial form. This memory organization allows the equivalent of simultaneous read/write operation so that read out of a field can begin as soon as half the lines are stored as shown by the associated read and write timing diagrams.

What is claimed is:
1. In a television display system of the type comprising:
(a) a video source for providing a video input signal of a given line rate and a given field rate;
(b) a clock source for providing read and write clock signals;
(c) memory means connected to said sources and responsive to said write clock signal for storing at least one field of said video signal and responsive to said read clock signal for providing a video output signal having a field rate N-times said given field rate and a line rate at least N-times said given line rate, N being an integer greater than unity; and
(d) display means coupled to said memory means for displaying said video output signal;
the improvement comprising:
(e) means for applying said video input signal to said clock source for synchronizing said clock signals at integer multiples of the frequency of a color subcarrier component of said video input signal;
(f) skew generator means responsive to at least said write clock signal and to a horizontal synchronizing component of said video input signal for providing a write clock skew indicating signal of each line stored in said memory means and a read clock skew indicating signals for each line recovered from said memory means signal; and
(g) means coupled to said memory means and to said skew generator means for imparting an effective delay to each line of said video output signal as a function of a difference between said skew indicating signals; and wherein said delay means comprises:
first circuit means for storing said write clock skew indicating signal with each line of said at least one field of said video input signal in said memory means;
second circuit means for recovering said write clock skew indicating signal from said memory means;
third means for subtracting the recovered write clock skew indicating signal from said read clock skew indicating signal to form a difference signal; and
fourth means for delaying said video output signal as a function of said difference signal.
2. A display system as recited in claim 1 whrein said skew generator means comprises:
measurement means coupled to said video source and to said clock source for providing a primary skew indicating signal representative of a skew error of said write clock signal with respect to said horizontal synchronizing component of said video input signal and for providing a secondary skew indicating signal derived from said primary skew indicating signal; and
means coupled to said measurement means for deriving said read clock skew indicating signal from said primary skew indicating signal and from said secondary skew indicating signal during mutually exclusive time intervals.
3. A display system as recited in claim 2 wherein said means coupled to said measurement means comprises storage means, first circuit means for alternately storing said primary and secondary skew indicating signals in said storage means during respective line intervals of said video output signal and means for effectively doubling the value of the stored skew indicating signal to provide said read clock skew indicating signal.

4. In a television display system of the type comprising:
(a) a video source for providing a video input signal of a given line rate and a given field rate;
(b) a clock source for providing read and write clock signals;
(c) memory means connected to said sources and responsive to said write clock signal for storing at least one field of said video input signal and responsive to said read clock signal for providing a video output signal having a field rate N-times said given field rate and a line rate at least N-times said given line rate, N being an integer greater than unity; and
(d) display means coupled to said memory means for displaying said video output signal;
the improvement comprising:
(e) means for applying said video input signal to said clock source for synchronizing said clock signals at integer multiples of the frequency of a color subcarrier component of said video input signal;
(f) skew generator means responsive to at least said write clock signal and to a horizontal synchronizing component of said video input signal for providing a write clock skew indicating signal for each line stored in said memroy means and a read clock skew indicating signals for each line recovered from said memory means and to
(g) means coupled to said memory means and to said skew generator means for imparting an effective delay to each line of said video output signal as a function of a difference between said skew indicating signals; and wherein said delay means comprises:
first means for delaying said video input signal as an inverse function of said write clock skew indicating signal prior to storage in said memory means; and
second means for delaying said video output signal as a direct function of said read clock skew indicating signal subsequent to recovery from said memory means.

5. A display system as recited in claim 4 wherein said skew generator means comprises:
measurement means coupled to said video source and to said clock source for providing a primary skew indicating signal representative of a skew error of said write clock signal with respect to said horizontal synchronizing component of said video input signal and for providing a secondary skew indicating signal derived from said primary skew indicating signal; and
means coupled to said measurement means for deriving said read clock skew indicating signal from said primary skew indicating signal and from said secondary skew indicating signal during mutually exclusive time intervals.

6. A display system as recited in claim 5 wherein said means coupled to said measurement means comprises storage means, first circuit means for alternately storing said primary and secondary skew indicating signals in said storage means during respective line intervals of said video output signal and means for effectively doubling the value of the stored skew indicating signal to provide said read clock skew indicating signal.

* * * * *